United States Patent [19]

Chiu

[11] Patent Number: 5,842,336
[45] Date of Patent: Dec. 1, 1998

[54] AUTOMATIC GARBAGE-COLLECTING CART

[76] Inventor: Kuo-Feng Chiu, No.2-1, Lane 5, Sec.3, Yang-Te Avenue, Taipei City, Taiwan

[21] Appl. No.: 648,248

[22] Filed: May 15, 1996

[51] Int. Cl.⁶ .................................................. A01D 7/06
[52] U.S. Cl. .................................. 56/400.02; 56/400.13; 56/400.11; 15/79.1; 280/47.34
[58] Field of Search ............................ 56/400.02, 400.11, 56/400.14, 400.21, 400.07, 400.03; 15/79.1, 83, 41.1; 280/47.34, 47.26, 659, 79.2

[56] References Cited

U.S. PATENT DOCUMENTS

| | | | |
|---|---|---|---|
| 666,689 | 1/1901 | Phillips | 56/400.02 |
| 949,104 | 2/1910 | Warrenfeltz | 15/79.1 |
| 1,439,832 | 12/1922 | Merrill | 15/79.1 X |
| 2,984,850 | 5/1961 | Law et al. | 15/79.1 |
| 3,119,136 | 1/1964 | Newsom | 15/79.1 |

*Primary Examiner*—Heather Shackelford
*Attorney, Agent, or Firm*—Browdy and Neimark

[57] ABSTRACT

An automatic garbage-collecting cart including a cart body, a collecting mechanism and a handle portion. When the cart body runs forward, a wheel shaft is driven to rotate the collecting mechanism which includes multiple spiral plates. The collecting mechanism is secured on the wheel shaft which sweeps up the garbage or debris on the ground. A stopper board is disposed at a rear end of the cart body to deflect the swept up garbage into the cart body.

2 Claims, 4 Drawing Sheets

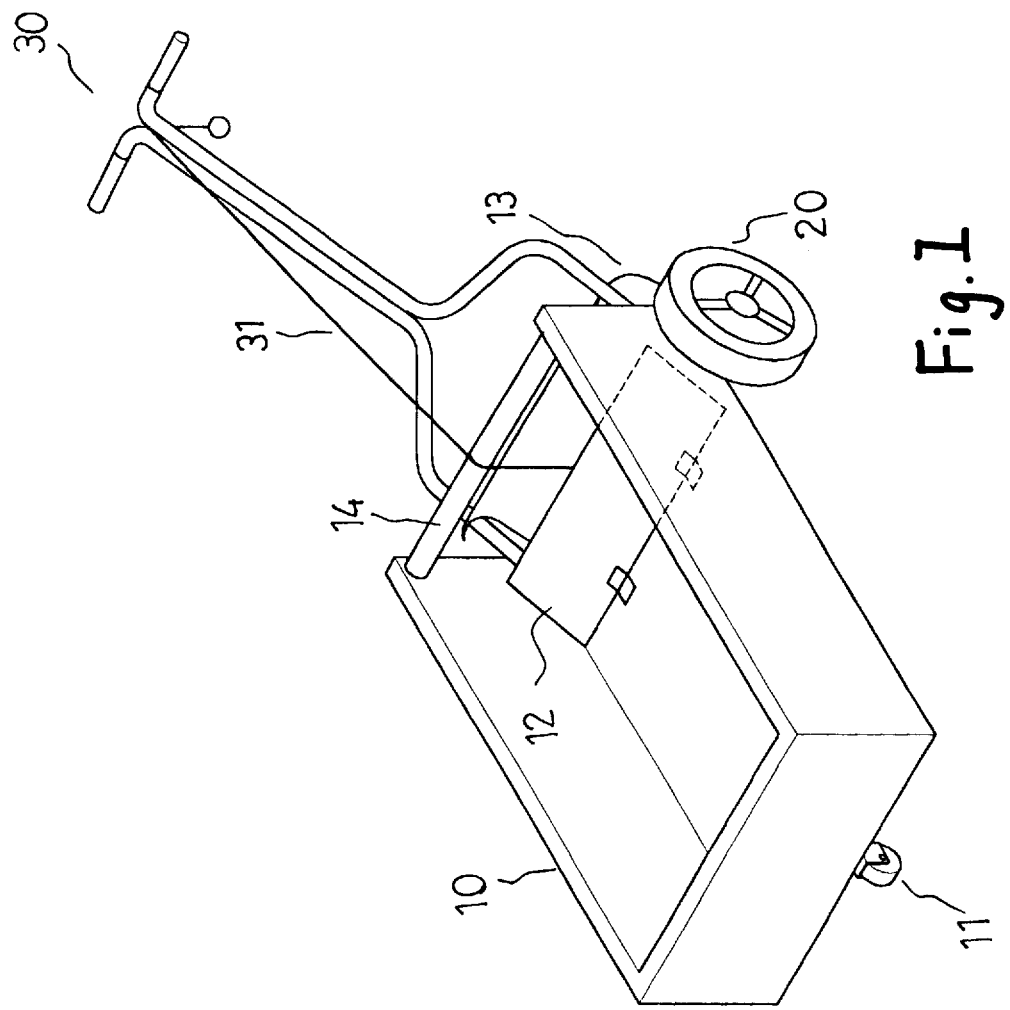

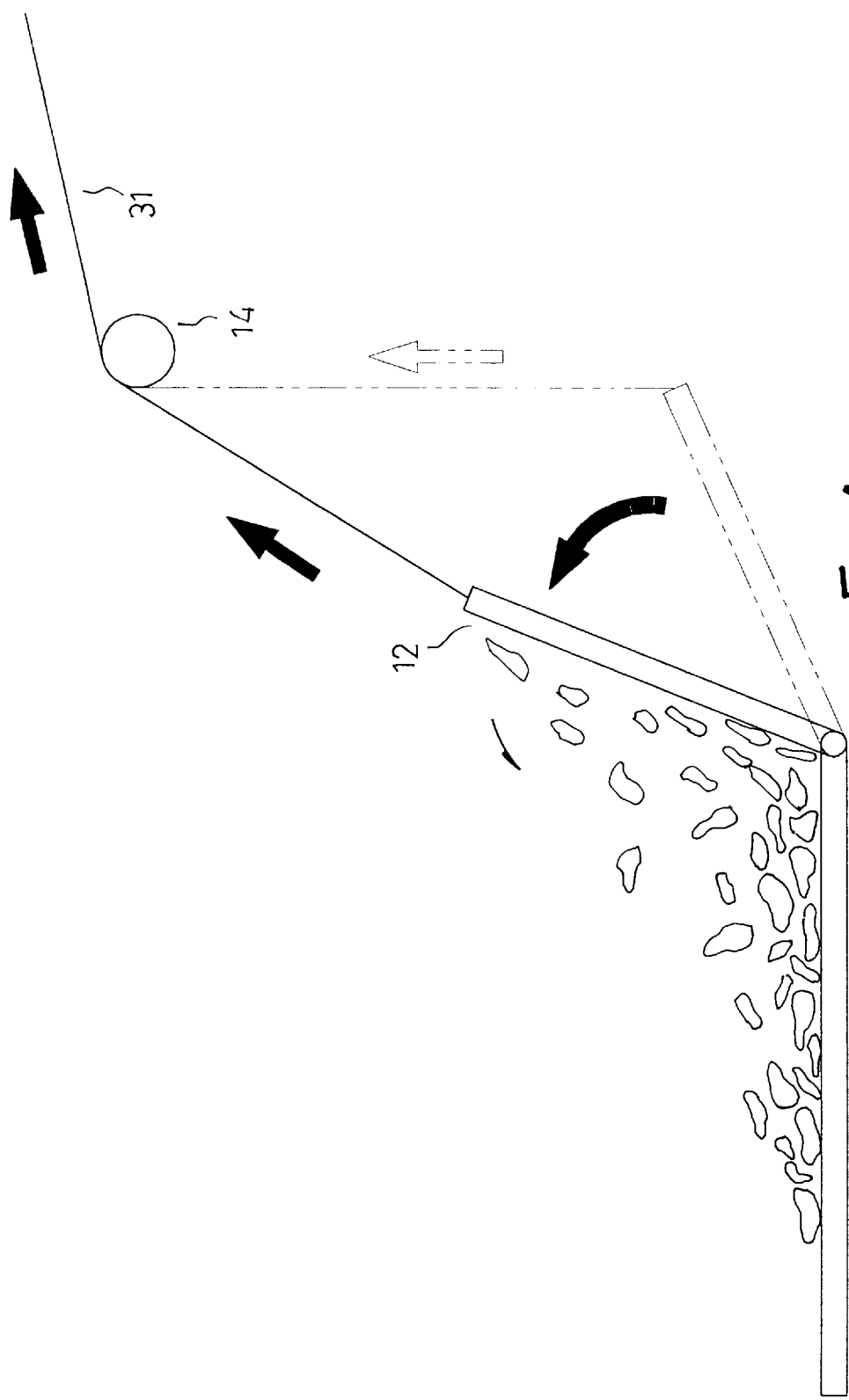

AUTOMATIC GARBAGE-COLLECTING CART

BACKGROUND OF THE INVENTION

The present invention relates to an automatic garbage-collecting cart which simultaneously collects garbage when running forward so as to save working time and increase working efficiency.

PRIOR ART

It is often seen that various kinds of garbage, or leaf or grass debris are scattered over a lawn. Currently, this debris is cleaned up in such a manner that the debris is blown by an electric blower to one place and then is swept off or sucked off by a vacuum sucker. Such procedure is quite time-consuming and laborious. In addition, much equipment is needed and much energy is wasted in such operation, while it is still difficult to achieve a satisfactory cleaning effect.

SUMMARY OF THE INVENTION

It is therefore a primary object of the present invention to provide an automatic garbage-collecting cart which simultaneously collects garbage when running forward so as to save working time and increase working efficiency.

The present invention can be best understood through the following description and accompanying drawings, wherein:

BRIEF DESCRIPTION OF THE DRAWINGS

FIG. 1 is a perspective view of the present invention;

FIG. 4 shows that the debris being pushed forward by pivoting the pivotable board of the present invention.

DETAILED DESCRIPTION OF THE PREFERRED EMBODIMENT

Figure 2A:
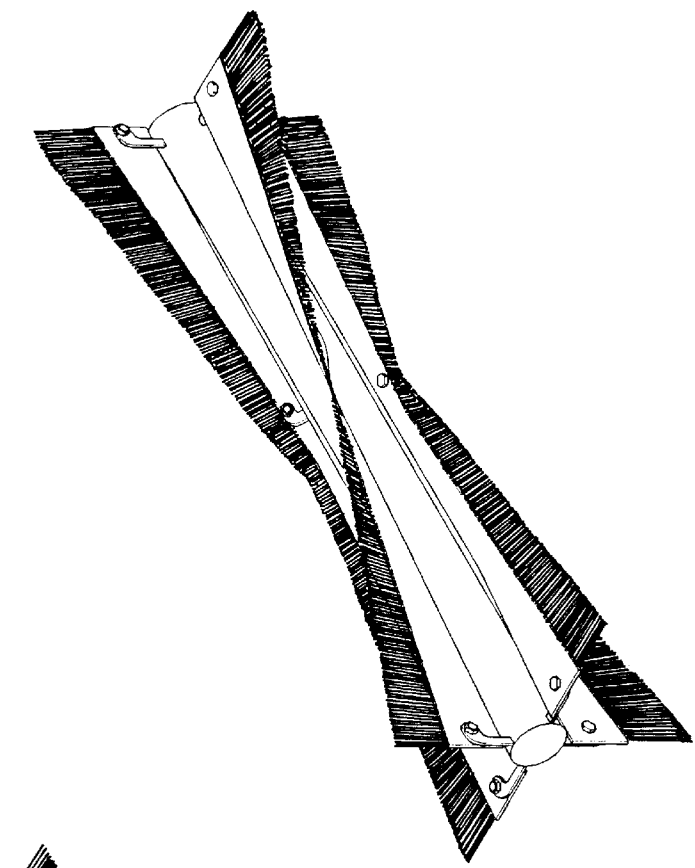
FIG. 2A is a perspective assembled view of the collecting mechanism of the present invention.

Please refer to FIG. 1. The present invention includes a box-like cart body 10 which has a bottom portion 5, a front end 1, a rear end 4, and two sides 2 and 3, and a collecting mechanism 20 coupled with a handle portion 30 and having two rear wheels 15.

Figure 2:
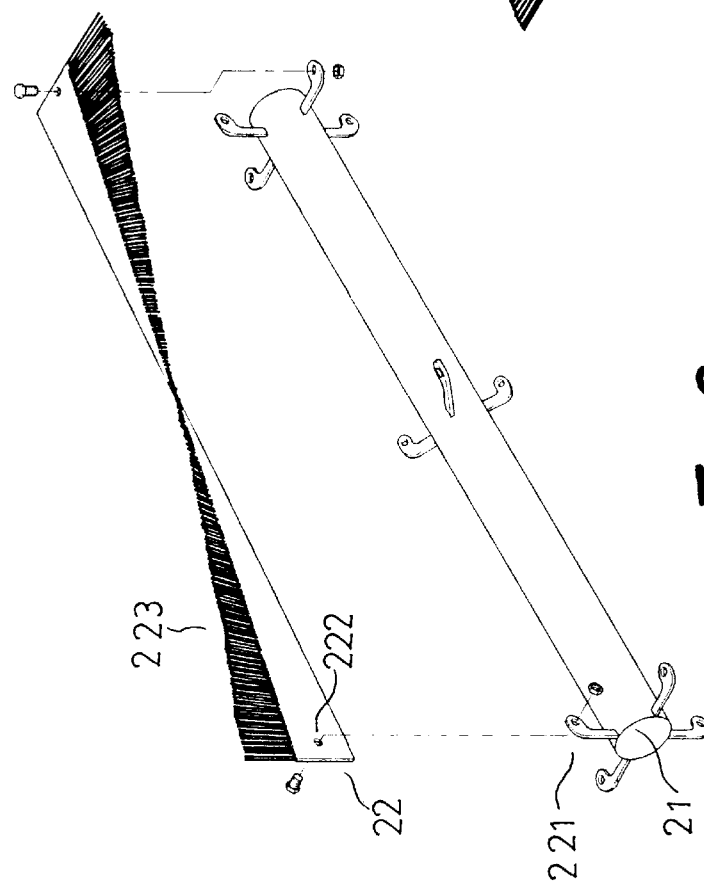
FIG. 2 is a partial perspective exploded view of the collecting mechanism of the present invention.

Referring to FIG. 2, when pushing the cart, the cart wheels 15 run forward to drive the wheel shaft 21 which rotates and serves as the power source for the collecting mechanism 20. The collecting mechanism 20 mainly includes several identical spiral plates 22 connected with a rotary shaft 21 via fixing pins 221, whereby the spiral plates 22 are arranged into a spiral pattern about the rotary shaft 21. When the rotary shaft 21 rotates, the spiral plates 22 revolve about the axis thereof. Each spiral plate 22 has a sweeping portion 223 on one edge opposite to the rotary shaft. The sweeping portion 223 is made of resilient material (such as nylon string or iron plate) engaged in the spiral plate 22, whereby when the spiral plate 22 sweeps over the ground, the debris on the surface of the ground can be swept up through an opening in the rear end and collected in the cart. The resilience of the sweeping portion 223 and not the spiral plates 22 engage the surfaces to be swept such as cement or tile, to pick up loose debris without damage to neither the spiral plates nor the surfaces to be swept. Accordingly, when moving forward, the cart body is able to simultaneously collect the debris on the ground.

The spiral plate 22 is replaceably secured on the fixing pins 221. The sweeping portion 223 of the spiral plate 22 is pre-molded and can be used with different attachments. When it is necessary to clean up other debris with different properties, the spiral plate 22 can be quickly replaced with a proper attachment so as to meet the requirements.

Figure 3:
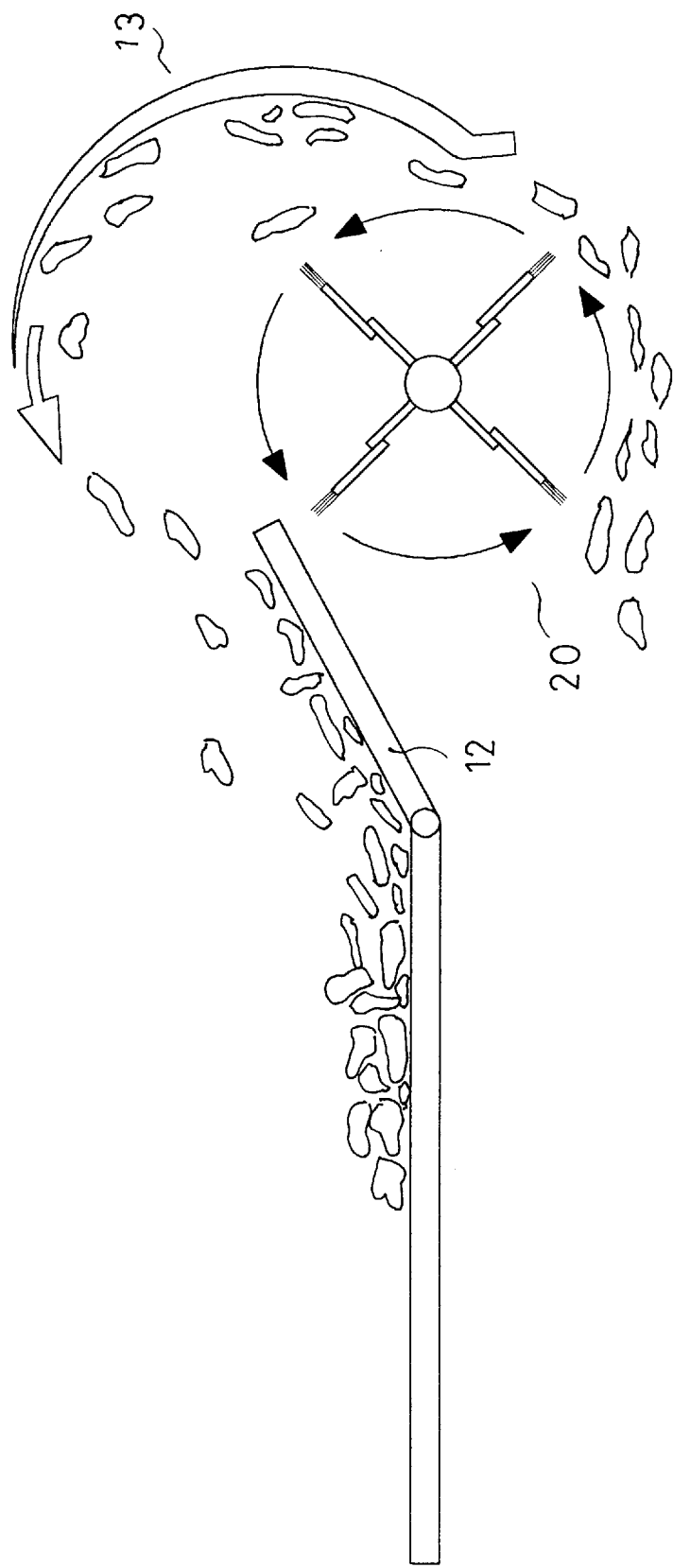
FIG. 3 shows the debris being swept up by the collecting mechanism and deflected by an arched stopper board so as to fall into the cart body of the present invention.

Referring to FIG. 3, the debris on the ground is swept upward and rearward by the collecting mechanism 20 through the opening at the rear end of the cart, to be deflected by the arch stopper board 13 secured to the cart and dropped onto a pivotable board 12. The debris then slips down to the bottom of the cart to be contained therein.

Referring to FIG. 4, when excessive debris is accumulated, the pivotable board 12 can be pivoted forward to compact the debris. This is achieved by a flexible wire 31 conducted backward from the handle portion 30 over a suspending beam 14 so as to pivot the pivotable board 12 upward. When board 12 is pivoted, the accumulated debris are pushed forward in the cart body to permit deposit of more debris.

The above embodiment is only an example of the present invention and the scope of the present invention should not be limited to the example. Any modification or variation derived from the example should fall within the scope of the present invention.

What is claimed is:

1. An automatic garbage-collecting cart comprising a box-like cart body, a collecting mechanism and a handle portion, wherein:

the cart body is a box-like container which has a bottom portion, a front end, a rear end, and two sides for receiving the collected garbage and equipped with cart wheels having a wheel shaft mounted to the cart body for moving forward, wherein a beam is engaged to and disposed above the rear end; and the handle portion extends from the rear end of the cart body for pushing the cart body, said garbage-collecting cart being characterized in that:

the collecting mechanism includes a rotary shaft and multiple spiral plates disposed thereon, the rotary shaft being operatively powered by the wheel shaft of the cart wheels, the spiral plates being arranged into a spiral pattern and attached to the rotary shaft, each of said spiral plates having a sweeping portion on an edge opposite to the rotary shaft, the sweeping portion being made of resilient material and engaged to each of the spiral plates, whereby when the spiral plates sweeps over the ground, the debris on the surface of the ground can be swept up and collected, the spiral plates being secured on the rotary shaft by fixing pins, wherein each of the spiral plates have a length such that when the spiral plates revolve about the rotary shaft, the spiral plates just sweep over the ground;

the cart body having an opening at the rear end, a pivotable board and an arch stopper board being secured to the cart, one end of the pivotable board being pivotally connected with the bottom portion of the rear end of the cart body and the other end of the pivotable board being connected to a flexible wire engaging the rear end at an angle, the arch stopper board being spaced from the rear end of the pivotable board and having a curvature to guide the debris swept up from the ground into the rear end of the cart body;

wherein the flexible wire runs from the handle portion over the beam and secured to the pivotable board, so that the flexible wire can be pulled at the handle portion to pivot the pivotable board upward; whereby the debris on the ground is swept upward and rearward by the collecting mechanism to be deflected by the arch stopper board and dropped onto the pivotable board, and wherein, when excessive debris is accumulated, the pivotable board can be pivoted upward by the flexible wire to push and compact the debris forward in the cart to permit additional debris to be disposed into the cart.

2. A garbage-collecting cart as claimed in claim 1, wherein the spiral plate is replaceably secured on the fixing pin of the rotary shaft.

* * * * *